(12) United States Patent
Allais (10) Patent No.: US 10,407,117 B2
(45) Date of Patent: Sep. 10, 2019

(54) SCOOTER

(71) Applicant: Denis Allais, Auckland (NZ)

(72) Inventor: Denis Allais, Auckland (NZ)

(*) Notice: Subject to any disclaimer, the term of this patent is extended or adjusted under 35 U.S.C. 154(b) by 138 days.

(21) Appl. No.: 15/291,473

(22) Filed: Oct. 12, 2016

(65) Prior Publication Data

US 2017/0029058 A1 Feb. 2, 2017

Related U.S. Application Data

(63) Continuation-in-part of application No. 14/714,662, filed on May 18, 2015, now Pat. No. 9,889,901, and
(Continued)

(30) Foreign Application Priority Data

May 20, 2014 (CN) ..................... 2014 2 0258886 U
Aug. 8, 2014 (NZ) ........................................ 419151

(51) Int. Cl.
*B62M 1/00* (2010.01)
*B62K 3/00* (2006.01)
(Continued)

(52) U.S. Cl.
CPC ............... *B62K 3/002* (2013.01); *B62J 25/00* (2013.01); *B62K 21/12* (2013.01); *B62M 1/00* (2013.01); *B62M 1/20* (2013.01)

(58) Field of Classification Search
CPC .......... B62K 3/002; B62K 21/12; B62J 25/00; B62M 1/00; B62M 1/20
(Continued)

(56) References Cited

U.S. PATENT DOCUMENTS 1,591,581 A 7/1926 Trejo
1,664,858 A 4/1928 Headley
(Continued)

FOREIGN PATENT DOCUMENTS

CN 201313613 Y 9/2009
CN 203780685 U 8/2014
(Continued)

OTHER PUBLICATIONS

Extended European Search Report dated Feb. 28, 2018 in European Application No. 17188438.0 (9 pages).
(Continued)

*Primary Examiner* — Jacob D Knutson
(74) *Attorney, Agent, or Firm* — Nixon & Vanderhye P.C.

(57) ABSTRACT

A scooter includes a connecting seat and a connecting bar extending rearward of the connecting seat, at least one rotatable front wheel and at least one rear wheel; a handle bar to control turning of front wheel; and a foot pedal connected to the connecting bar, the foot pedal having a left foot pedal portion and a right foot pedal portion; each of the left and right foot pedal portions being configured to support a rider's left foot and right foot, respectively, to lie substantially parallel to the connecting bar. The front wheel has a diameter, and the front and rear wheels are spaced apart a lateral distance, and wherein a ratio of the diameter to the lateral distance is selected to allow a rider to propel the scooter along flat ground without pushing the feet along the ground. The front wheel may have a rounded shape as seen from front view to establish substantially tangential line contact with a rolling surface. The pedal defines a support surface for the rider's feet, and the support surface may be positioned above a plane connecting a rotation axis of the front wheel and a rotation axis of the rear wheel.

35 Claims, 8 Drawing Sheets

Related U.S. Application Data a continuation-in-part of application No. 29/522,796, filed on Apr. 2, 2015, now Pat. No. Des. 772,990.

(51) Int. Cl.
  *B62K 21/12* (2006.01)
  *B62J 25/00* (2006.01)
  *B62M 1/20* (2006.01)

(58) Field of Classification Search
  USPC .......................................................... 280/221
  See application file for complete search history.

(56) References Cited

U.S. PATENT DOCUMENTS

| | | | |
|---|---|---|---|
| 1,689,916 A | 10/1928 | Fisher | |
| 1,771,813 A | 7/1930 | Norman | |
| 1,844,305 A | 2/1932 | White | |
| 3,179,433 A | 4/1965 | Flack | |
| 3,620,547 A | 11/1971 | Vaverek | |
| 4,203,610 A | 5/1980 | Mihalik | |
| 4,204,698 A | 5/1980 | Mihalik | |
| 4,669,746 A | 6/1987 | Wu | |
| D292,221 S | 10/1987 | Mueller | |
| 4,705,286 A | 11/1987 | Lauzier et al. | |
| D295,428 S | 4/1988 | Cummings | |
| 4,761,014 A | 8/1988 | Huang | |
| 4,799,701 A * | 1/1989 | Lindau .................. | B62K 3/002 |
| | | | 188/74 |
| D300,756 S | 4/1989 | Cummings | |
| 4,824,131 A | 4/1989 | Thay | |
| D301,157 S | 5/1989 | Hess | |
| D305,134 S | 12/1989 | Rubio et al. | |
| 5,039,121 A | 8/1991 | Holter | |
| 5,072,961 A | 12/1991 | Huppe | |
| 5,328,193 A | 7/1994 | Shiew | |
| 5,470,089 A | 11/1995 | Whitson et al. | |
| D392,001 S | 3/1998 | Chen | |
| 5,785,331 A | 7/1998 | Rappaport | |
| 5,899,474 A | 5/1999 | Grutzik | |
| 5,927,733 A | 7/1999 | Banda | |
| 5,992,864 A | 11/1999 | Dickson et al. | |
| 6,135,474 A | 10/2000 | Nakamura | |
| 6,149,177 A | 11/2000 | Valdez | |
| 6,168,175 B1 | 1/2001 | Lan | |
| 6,250,656 B1 | 6/2001 | Ibarra | |
| 6,273,439 B1 | 8/2001 | Ray et al. | |
| 6,279,929 B1 | 8/2001 | Fruechtenicht | |
| 6,378,879 B2 | 4/2002 | Rappaport | |
| 6,450,516 B1 | 9/2002 | Nall, III | |
| 6,488,295 B1 | 12/2002 | Bryant | |
| 6,588,784 B1 | 7/2003 | Chen | |
| D479,734 S | 9/2003 | Schaffer | |
| 6,648,355 B2 | 11/2003 | Ridenhour | |
| 6,659,486 B2 | 12/2003 | Eschenbach | |
| D486,532 S | 2/2004 | Christianson | |
| 6,739,606 B2 | 5/2004 | Rappaport | |
| D492,367 S | 6/2004 | Pomroy et al. | |
| D497,397 S | 10/2004 | Sramek | |
| 6,854,752 B2 | 2/2005 | Chao | |
| D503,661 S | 4/2005 | Huntsberger et al. | |
| 7,261,310 B2 | 8/2007 | Yifrah et al. | |
| 7,311,164 B1 * | 12/2007 | Kertes ....................... | B62J 6/00 |
| | | | 180/180 |
| 7,458,596 B1 | 12/2008 | Serna | |
| 7,487,982 B2 | 2/2009 | Chan | |
| 7,543,829 B1 | 6/2009 | Barnes | |
| 7,803,090 B2 | 9/2010 | Kraus | |
| 7,951,049 B2 | 5/2011 | Mondello et al. | |
| 8,006,786 B1 * | 8/2011 | Chapman ............. | A61G 5/1094 |
| | | | 180/65.1 |
| D645,522 S | 9/2011 | Powers | |
| D653,711 S | 2/2012 | Ngai | |
| 8,322,735 B2 | 12/2012 | Steinbach | |
| D692,963 S | 11/2013 | Radtke | |
| D717,881 S | 11/2014 | Radtke | |
| D748,738 S | 2/2016 | Hadley | |
| D750,180 S | 2/2016 | Edlauer | |
| 2002/0070519 A1 | 6/2002 | Rappaport | |
| 2002/0093161 A1* | 7/2002 | Udwin ................... | B62K 3/002 |
| | | | 280/87.05 |
| 2002/0121754 A1 | 9/2002 | Nall, III | |
| 2003/0001350 A1 | 1/2003 | Eschenbach | |
| 2003/0127822 A1 | 7/2003 | Fleck et al. | |
| 2003/0132592 A1 | 7/2003 | Dombroski | |
| 2003/0193159 A1 | 10/2003 | Ridenhour | |
| 2003/0214113 A1 | 11/2003 | Bank | |
| 2004/0004341 A1 | 1/2004 | Carr et al. | |
| 2004/0012166 A1 | 1/2004 | Reginato | |
| 2004/0080130 A1 | 4/2004 | Lewis | |
| 2004/0087416 A1* | 5/2004 | Trenary ............. | A63C 17/0026 |
| | | | 482/51 |
| 2005/0248117 A1 | 11/2005 | Hung | |
| 2005/0253357 A1 | 11/2005 | Cheng et al. | |
| 2005/0285368 A1 | 12/2005 | Yifrah et al. | |
| 2006/0076752 A1 | 4/2006 | Montague et al. | |
| 2006/0186641 A1 | 8/2006 | Chan | |
| 2007/0001422 A1 | 1/2007 | Kraus | |
| 2007/0278763 A1 | 12/2007 | Saville | |
| 2008/0246248 A1* | 10/2008 | Rabadi ................... | B62K 3/002 |
| | | | 280/281.1 |
| 2009/0212529 A1 | 8/2009 | Stenberg | |
| 2010/0253036 A1 | 10/2010 | Liu et al. | |
| 2011/0025008 A1 | 2/2011 | Grossman | |
| 2011/0233894 A1 | 9/2011 | Lovley, II | |
| 2012/0049476 A1* | 3/2012 | Querro ................... | B62K 3/002 |
| | | | 280/87.041 |
| 2013/0049334 A1* | 2/2013 | Powers .................. | B62K 3/002 |
| | | | 280/655.1 |
| 2013/0257003 A1* | 10/2013 | Chen ....................... | B62B 3/001 |
| | | | 280/87.041 |
| 2015/0336626 A1 | 11/2015 | Allais | |

FOREIGN PATENT DOCUMENTS

| | | | | |
|---|---|---|---|---|
| DE | 200 17 625 U1 | 12/2000 | | |
| WO | WO-0115967 A1 * | 3/2001 | ............. | B62K 3/002 |

OTHER PUBLICATIONS

Allais, U.S. Appl. No. 29/522,796, filed Apr. 2, 2015, entitled "Scooter".

* cited by examiner

SCOOTER

CROSS REFERENCE TO RELATED APPLICATION

This application is a continuation-in-part of U.S. application Ser. No. 14/714,662, filed May 18, 2015, which claims priority to Chinese Utility Model Application No. 201420258886.5, filed May 20, 2014, and is a continuation-in-part of U.S. Design application Ser. No. 29/522,796, filed Apr. 2, 2015, now allowed, which claims the benefit of New Zealand Design Application No. 419151, filed Aug. 8, 2014, the entire contents of each which are incorporated herein by reference in their entirety.

FIELD OF THE TECHNOLOGY

The present technology relates to a personal riding device, in particular a scooter.

BACKGROUND

Personal riding devices, e.g., in the form of scooters and skate boards, etc., are known in the art. Such riding devices typically require the rider to frequently "pedal" with his or her foot, even on relatively flat or flat ground. Although there are self-propelled sit down or recumbent riding devices, such as the EZYRoller™ or the EZYRoller™ Drifter™, which devices do not require the rider to use his or her feet to propel himself or herself, there are no known intuitively self-propelled riding devices of the stand-up type, such as scooters with handlebars, where the rider is not required to pedal, or pedal as much.

SUMMARY OF THE TECHNOLOGY

One aspect is to provide a scooter with a handlebar that provides a unique riding experience to the rider. The scooter is designed to allow the rider to leverage his movement and weight with increased freedom.

Another aspect of the present technology is to provide a scooter providing the rider with a unique riding experience, e.g., by allowing for relatively more cruising and relatively less "pedaling" when if ridden on a substantially flat surface. The scooter may provide the rider with a riding experience somewhat comparable to skiing, in that the rider faces forward with the feet facing forward, and the rider is able to shift his or her center of gravity relative to the centerline of the scooter to provide a forward directed propelling force. This can be enhanced with turning and/or tilting of the scooter as well. The wheel(s) of the scooter may be substantially hard or incompressible and/or may have a rounded shape as seen from front view or in cross section to help enhance the propelling action, and allow physical leveraging of the rider's weight into a forward propelling force.

Still another aspect of the present technology is related to a scooter having a main frame, at least a front wheel and a rear wheel supported by the frame, a handlebar to turn the front wheel, and a pedal configured to allow the rider to ride facing forward. The scooter is dimensioned and shaped to allow sustained or extended pedal free cruising, e.g., the pedal's riding surface is positioned higher than a plane connecting axes of the wheels, a ratio of the diameter of the wheels to the distance between the axes is set in a predetermined range, and/or the pedal and/or wheels are shaped to allow tilting of the scooter in a predetermined range.

Yet another aspect of the present technology relates to a scooter comprising a main frame having a connecting seat and a connecting bar extending rearward of the connecting seat; a rotatable front fork supported by the connecting seat and a rear fork extending from a rear end of the connecting bar; at least one front wheel supported by the front fork and at least one rear wheel supported by the rear fork; a handle bar to control turning of the front fork and therefore the front wheel; and a foot pedal connected to the connecting bar, the foot pedal having a left foot pedal portion and a right foot pedal portion; each of the left and right foot pedal portions being configured to support a rider's left foot and right foot, respectively, to lie substantially parallel to the connecting bar; wherein the front wheel has a diameter, and the front and rear wheels are spaced apart a lateral distance, and wherein a ratio of the lateral distance to the diameter is selected to allow a rider to propel the scooter along flat ground without pushing the feet along the ground. The ratio may be between about 3 and about 5, about 3.5 to about 4.5, about 4.3, or about 4.

In another form a scooter may comprise a main frame having a connecting seat and a connecting bar extending rearward of the connecting seat; a rotatable front fork supported by the connecting seat and a rear fork extending from a rear end of the connecting bar; at least one front wheel supported by the front fork and at least one rear wheel supported by the rear fork; a handle bar to control turning of the front fork and therefore the front wheel; and a foot pedal connected to the connecting bar, the foot pedal having a left foot pedal portion and a right foot pedal portion; each of the left and right foot pedal portions being configured to support a rider's left foot and right foot, respectively, to lie substantially parallel to the connecting bar; wherein the front wheel has a rounded shape as seen from front view to establish substantially tangential line contact with a rolling surface as the handlebar is tilted from vertical up to about 15°, 20°, 25° or even 30°.

In yet another form, a scooter may comprise a main frame having a connecting seat and a connecting bar extending rearward of the connecting seat; a rotatable front fork supported by the connecting seat and a rear fork extending from a rear end of the connecting bar; at least one front wheel supported by the front fork and at least one rear wheel supported by the rear fork; a handle bar to control turning of the front fork and therefore the front wheel; and a foot pedal connected to the connecting bar, the foot pedal having a left foot pedal portion and a right foot pedal portion; each of the left and right foot pedal portions being configured to support a rider's left foot and right foot, respectively, to lie substantially parallel to the connecting bar, wherein the pedal defines a support surface for the rider's feet, the support surface being positioned above a plane connecting a rotation axis of the front wheel and a rotation axis of the rear wheel.

Other aspects, features, and advantages of the present technology will become apparent from the following detailed description when taken in conjunction with the accompanying drawings, which are a part of this disclosure and which illustrate, by way of example, principles of the present technology.

BRIEF DESCRIPTION OF THE DRAWINGS

The accompanying drawings facilitate an understanding of the various examples of this present technology. In such drawings:

FIG. 9B-1 is an enlarged detail view of a portion of FIG. 9B.

FIG. 9C-1 is an enlarged detail view of a portion of FIG. 9C.

DETAILED DESCRIPTION OF PRESENT TECHNOLOGY

The following description is provided in relation to several examples which may share common characteristics and features. It is to be understood that one or more features of any one example may be combinable with one or more features of the other examples. In addition, any single feature or combination of features in any of the examples may constitute additional examples.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

Figure 1:
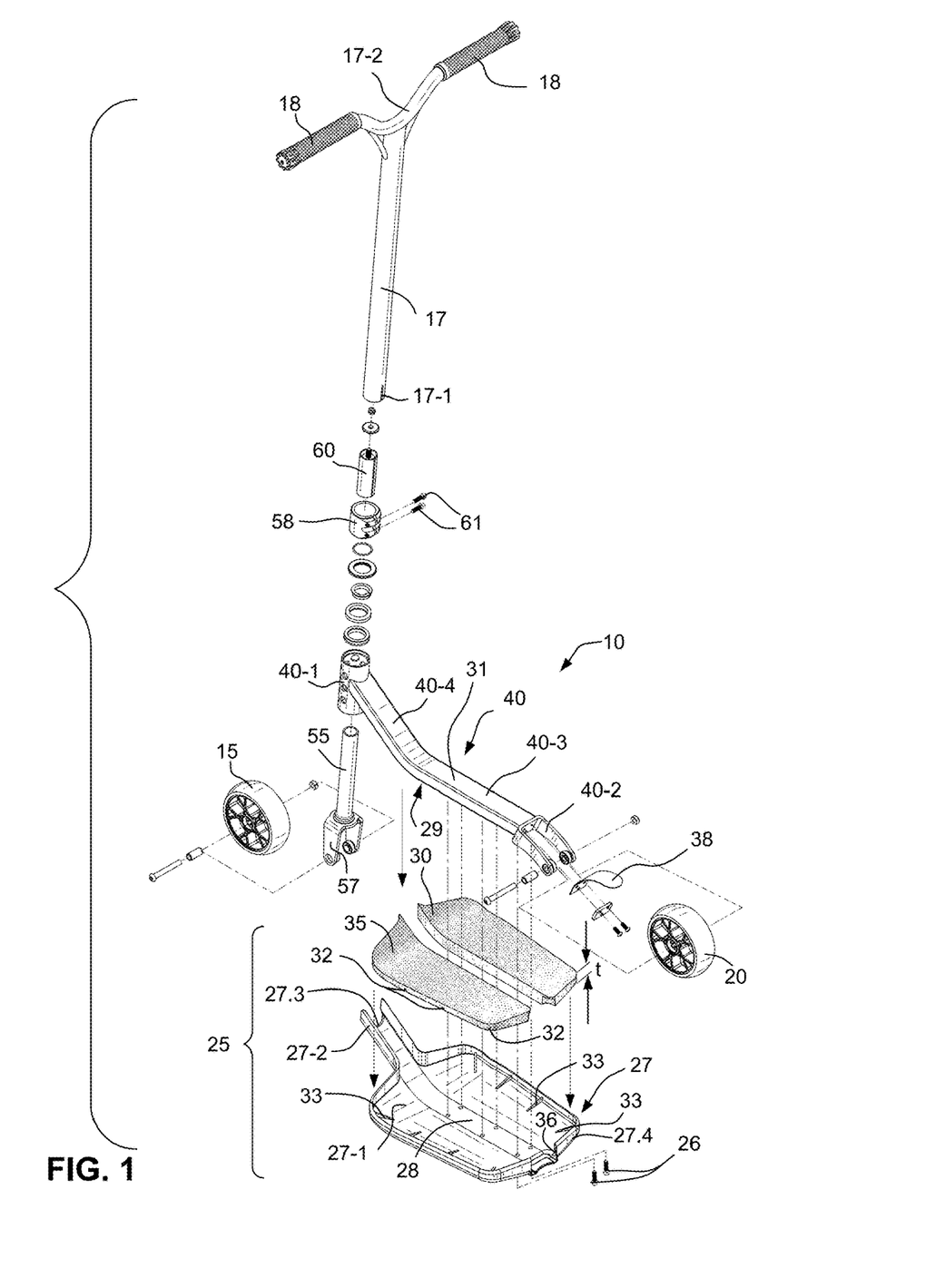
FIG. 1 is an exploded perspective view of a scooter according to an example of the present technology.

FIG. 1 discloses a scooter 10 according to the present technology, in exploded form. The scooter 10 includes at least one front wheel 15 and at least one rear wheel 20. The front wheel 15 is steerable or turnable using a handlebar 17 which can be rotated by a pair of handgrips 18.

Figure 6:
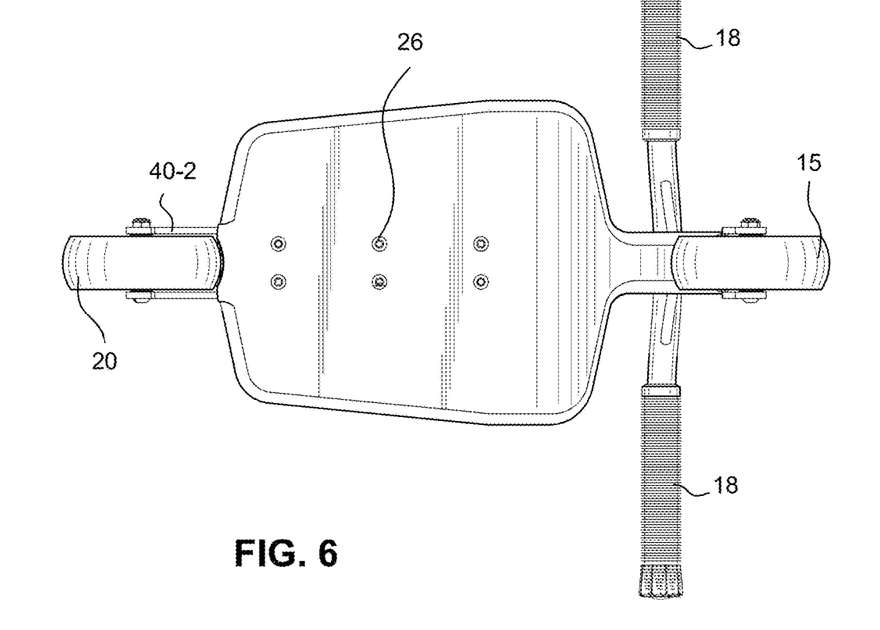
FIG. 6 is a bottom view thereof.

Scooter includes a pedal 25 having a right foot portion 30 and a left foot portion 35. A connecting bar 40 (e.g., a hollow profile of cast iron or aluminum or other suitable material) is connected to the pedal 25. For example, a plurality of securing devices, e.g. in the form of threaded bolts 26 are used to connect the pedal 25 to the connecting bar 40. The bolts have countersunk heads as shown in FIG. 6. For example, the pedal includes a deck 27 having a base 28 through which the securing devices 26 are passed, and a bottom surface 29 of the connecting bar includes a corresponding number of holes, e.g. threaded holes, to receive the securing devices 26. Terminal ends of the securing devices 26 terminate within the thickness of the connecting bar 40, such that they do not protrude through the top. In this fashion, the top surface 31 of the connecting bar 40 need not have any apertures or holes in order to receive and engage the securing devices 26.

The right foot portion 30 and the left foot portion 35 may be in the form of a pair of inserts, e.g. a right foot insert and a left foot insert. The inserts may be attached to the deck in either a permanent or removable fashion. If removable, this allows different styles or colors or patterns, etc., of inserts to be switched out according to the rider's preference. Of course, each insert may be permanently installed in place relative to the deck, e.g. using adhesives, or known mechanical attachment mechanisms. To facilitate alignment and enhance stability, each insert includes at least one recess or groove 32 dimensioned to receive corresponding rib 33 provided in the deck 27.

The deck 27 includes a forward portion 27-1 to receive forward portions of the inserts. The forward portion 27-1 of the deck 27 and the inserts are inclined or curved upwardly in order to effectively form a stop for the tip of the rider's shoes. The forward end 27-2 of the deck 27 includes an extension which receives an angled portion 40-4 of the connecting bar 40. The connecting bar 40 includes a connecting seat 40-1, e.g. in the form of a hollow cylindrical section, and the forward end 27-2 of the deck includes a curved end 27.3 to match the shape of the cylindrical outer surface of the connecting seat 40-1.

A rear portion of the deck includes a cut out 36, and a rear portion of the connecting bar extends beyond the rear portion of the deck 26. The cut out 36 has a shape to accommodate a rounded shape of the rear wheel 20, as will be explained in more detail below. A rear portion of a main body (horizontal section) 40-3 of the connecting bar 40 includes a rear fork 40-2 which is used to support the rear wheel 20. The rear fork 40-2 may be separately attachable and may be pivotable. The rear wheel, like the front wheel, has a curved profile seen from front view or cross-section.

The scooter also includes a brake 38 that in this example is affixed to the rear end of the connecting bar or the fork 40-2. The brake 38 includes a cantilevered strip of material, e.g. metal, which may be initially spaced away from the rear wheel but may be resiliently depressed downwards into contact with the rear wheel 20 for braking purposes. After depression, the brake automatically returns to its relaxed position due to resiliency, in which it is spaced away from the wheel, i.e. in a non-braking position.

The deck 27 includes a rim 27.4 which extends upwardly from the base. A height of the rim substantially matches the height or thickness t of each of the pedals 25, 30 such that the inserts and the rim are substantially flush. Moreover, the thickness of the inserts is substantially the same as the thickness of the connecting bar 40 such that the connecting bar and the pedals are substantially flush as well.

The handlebar 17 is upwardly connected in order to steer the front wheel. The handlebar 17 may be tilted slightly backwards, e.g. α=about 3-10°, e.g. about 5-7°. A shaft 55 extends through the connecting seat 40-1 and includes a lower end which forms or includes or is attached to a front fork 57 and an upper end which forms a connection with a lower end 17.1 of the handlebar. The handlebar may include a collar 58 which is connectable to a sleeve 60 that surrounds the shaft 55. The collar 58 may be affixed to the sleeve 60 and shaft by one or more bolts 61 or other fixing mechanisms. The handlebar 17 includes a cross bar 17.2 with grip portions 18 so that the rider may turn the front wheel 15 in the desired direction.

Figure 2:
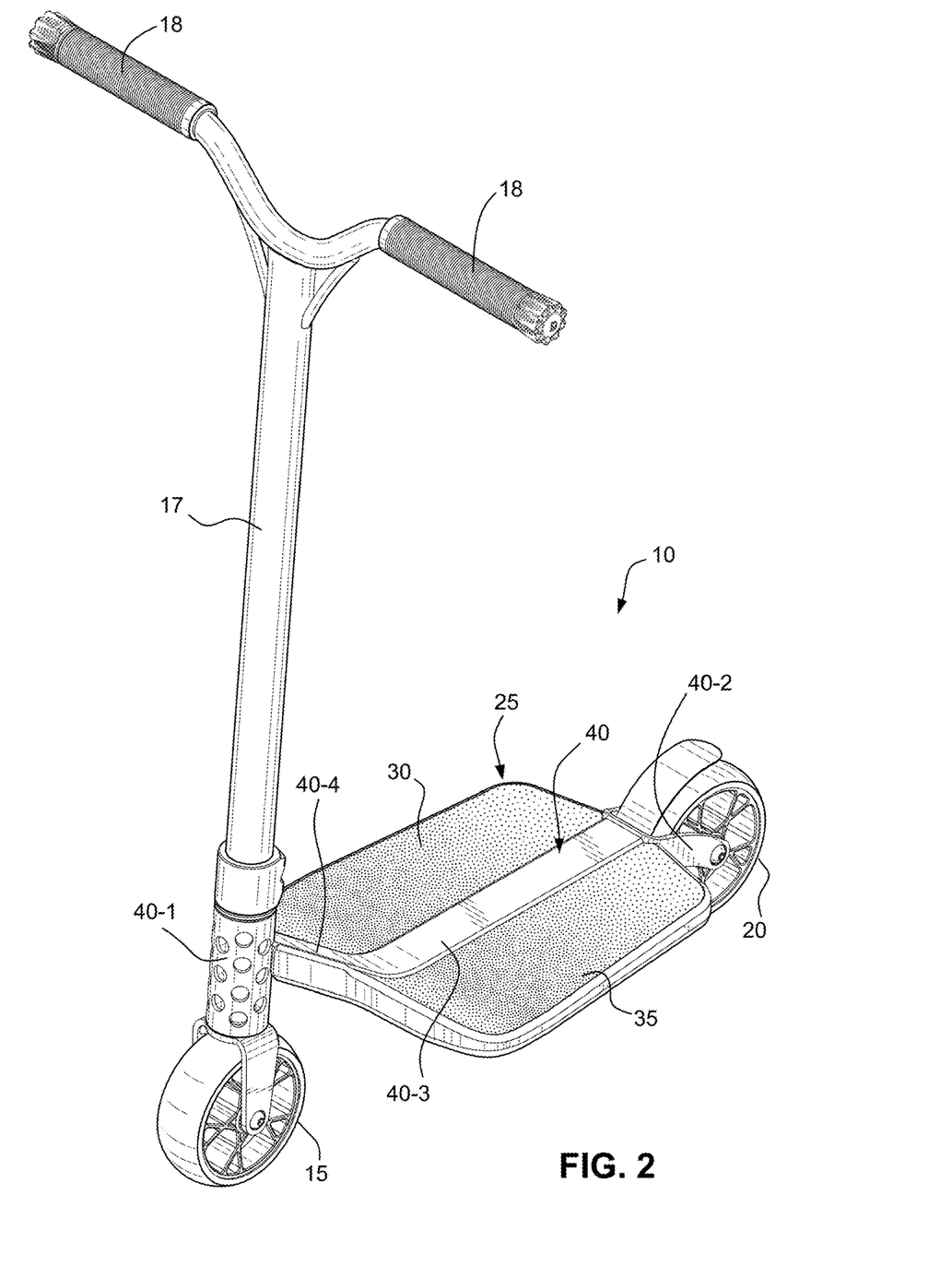
FIG. 2 is a perspective assembled view thereof.
Figure 3:
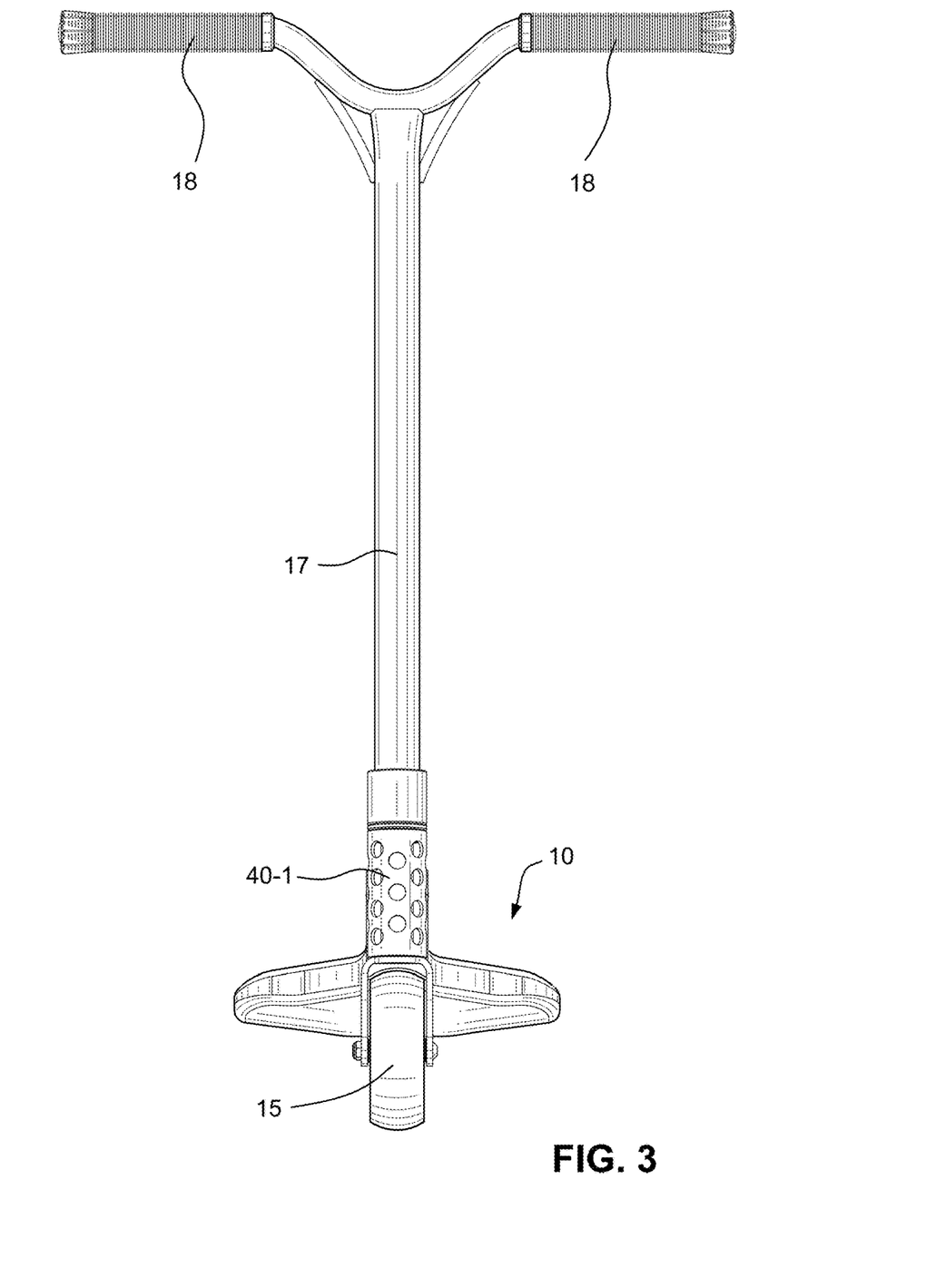
FIG. 3 is a front view thereof.
Figure 7:
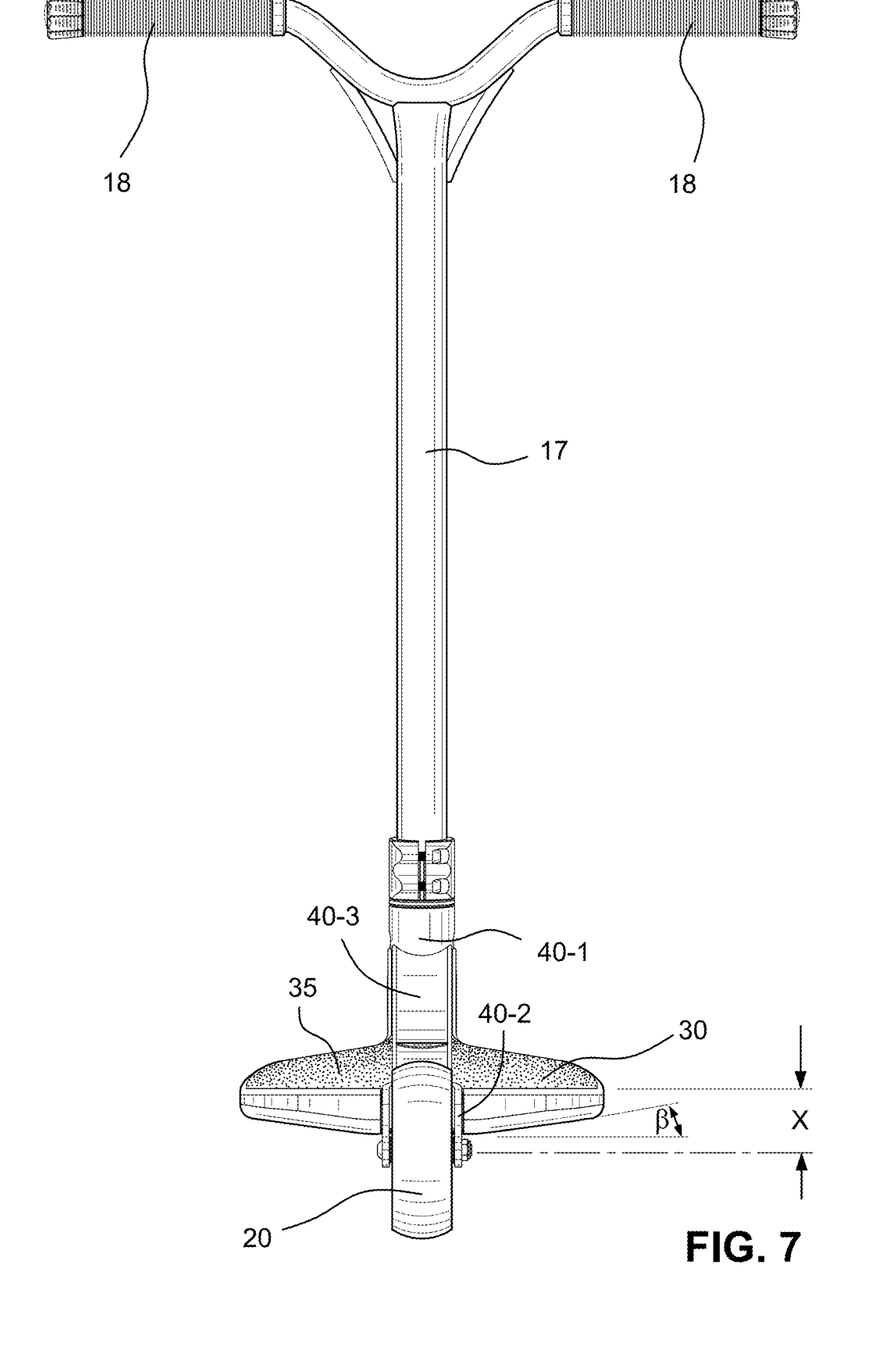
FIG. 7 is a rear view thereof.
Figures 9A, 9B, 9C, 9D:
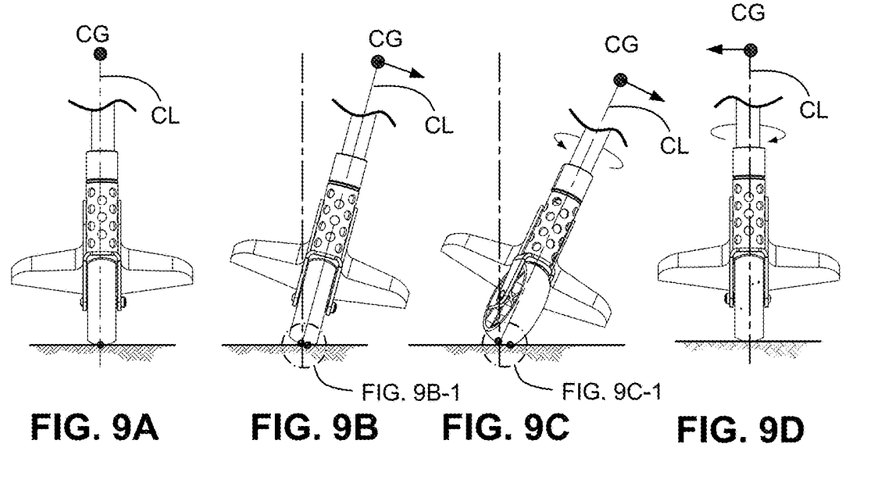
FIGS. 9A-9G in schematic fashion illustrate a sequence of how the scooter of the present technology may be propelled.
Figure 9B:
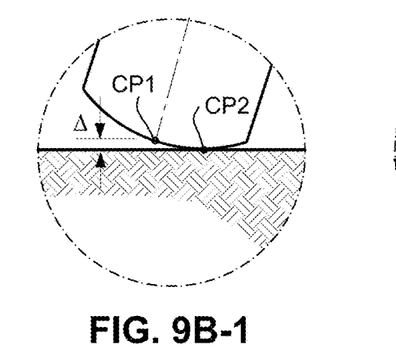
Figure 9C:
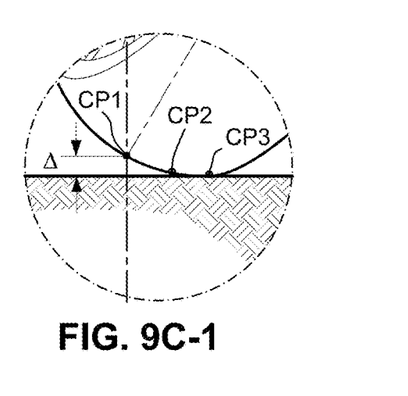
Figures 9E, 9F:
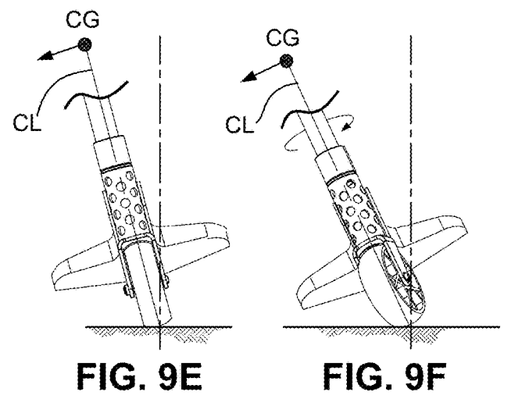
Figure 9G:
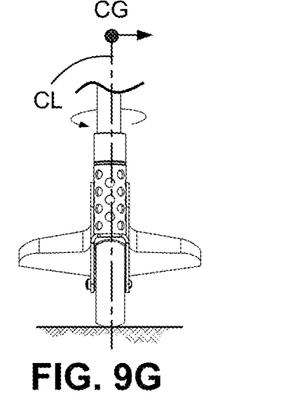

While FIG. 1 shows an exploded view of the scooter, FIG. 2 shows a perspective view in an assembled position. FIG. 3 shows a front view of the scooter, in which it can be seen that the front wheel 15 has a rounded shape. The wheel is made up of substantially non-compressible and/or non-deformable material, and yet provides sufficient grip with the ground especially when making turns. Wheels 15, 20 may be made of polyurethane compounds, PVC compounds and/or rubber compounds. Because of the rounded shape, seen from front or cross sectional view, this establishes essentially tangential line contract with a rolling surface or the ground, per FIGS. 9B-1 and 9C-1. The rear wheel 20 may have an identical rounded shape matching the shape of the front wheel. The front wheel and the rear wheel may comprise a plastic rim 15.1, 20.1 (FIG. 4) and a hard outer cover layer 15.2, 20.2 having the rounded shapes. As shown in FIGS. 9C and 9F and others, the rider may tilt the scooter either towards the left or towards the right, up to an angle of up to about 0°-30°, 0°-25°, or 0°-15°, or up to about 15°, 20°, 25° or 30°. The deck is made to accommodate such tilting whereby the bottom surface of the deck is angled or curved upwardly, e.g. β=about 5-10°, to increase the distance between the edges of the deck and the ground, as shown in FIG. 7.

Figure 5:
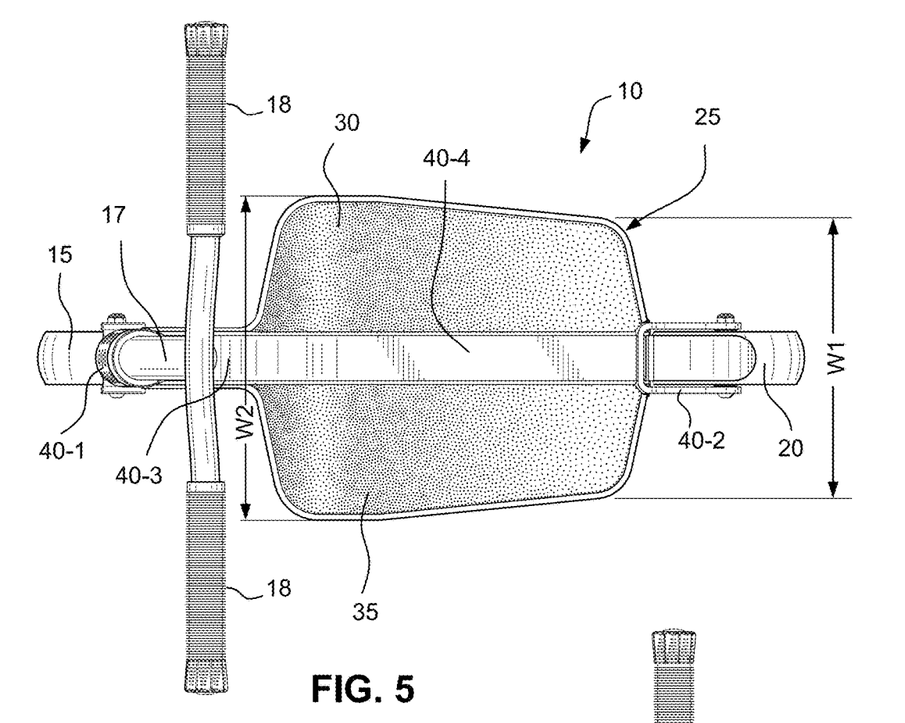
FIG. 5 is a top view thereof.

FIG. 5 illustrates a shape of the pedal 25 from the top view. While the pedal can have a generally rectangular or square shape, or other shapes, it may also have a generally trapezoidal shape as shown in FIG. 5. In FIG. 5, the width of the rear part of the pedal is less than the width of the front part of the pedal. The width of the rear part of the pedal, for example, is between about 7-9 inches and about 8-10 inches at the front. Moreover, the width of the pedal may be about 3-7 or about 5 times as wide as the width of the connecting bar 40.

Each foot insert may be made from a resiliently deformable and/or compressible material. Each foot insert may also have a textured surface to enhance grip, e.g. a pattern of small half tetrahedrons or four sided pyramids (e.g., as schematically illustrated in FIG. 1 (via stippling).

As shown in FIG. 1, each wheel has a diameter D (e.g., about 4-6 inches, 4.5-5.5 inches, or about 5 inches or 125 mm) and the rotating axis of the wheels are spaced apart a wheel based distance WB (e.g., about 15-19 inches, e.g., 16-17 inches or about 17-18 inches). The ratio of the lateral distance between the wheels to the diameter of the wheels is selected to allow a rider to propel the scooter without pushing the feet along the ground, or by requiring the rider to push his or her feet less compared to conventional scooters. The ratio may be between about 3 and about 5. However, the ratio may also be set to be between about 3.5 and about 4.5, between about 3.7 or about 4.3, or the ratio may be about 4. The width of each wheel 15, 20 is about 1½" to about 2", or about 1⅞" or 42 mm. The radius of curvature is about 28-48 mm, 33-43 mm or about 38 mm.

The ability for the rider to propel him or herself without pedaling (or at least not as much) along the ground, may also be enhanced by the round shape of the wheel, the width of the pedal, the ability to turn one or both wheels (front and back) and/or the position of the riding deck relative to the wheel axes. Any one of these factors or combination of which may allows the rider to control his or her position relative to the scooter, e.g. control the rider's center of gravity relative to a centerline of the scooter, to propel the scooter.

Figure 4:
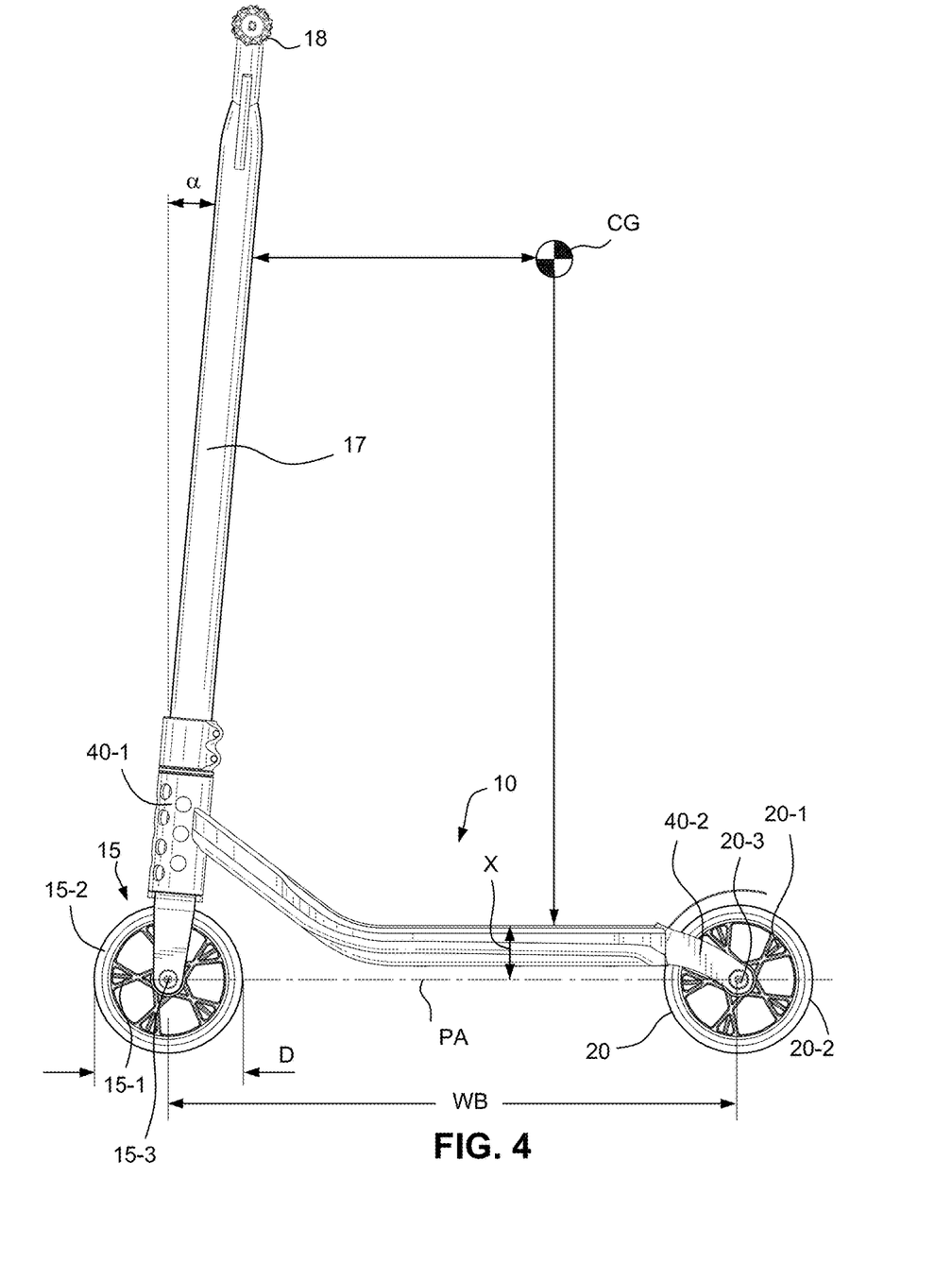
FIG. 4 is a left side view thereof.

FIG. 4 also shows that a line connecting the axes 15-3, 20-3 of the front and rear wheels define a plane PA which is positioned a distance X below a foot surface defined by the upper surface of the pedal, rim and/or connecting bar. While positioning the foot supporting surface above the plane PA that connects the axes of the wheels may seem to result in a more unstable situation, such also helps to enable the rider to self-propel the scooter without necessarily kicking off the ground with a foot or at least pushing the foot on the ground with less frequency. In particular, the handlebar and wheel may be tilted through a rather large range, e.g., of about 20-30°, or about 25° from vertical, based on the height of the deck and the angled bottom edges as seen at least in FIGS. 7 and 9F.

Figure 8:
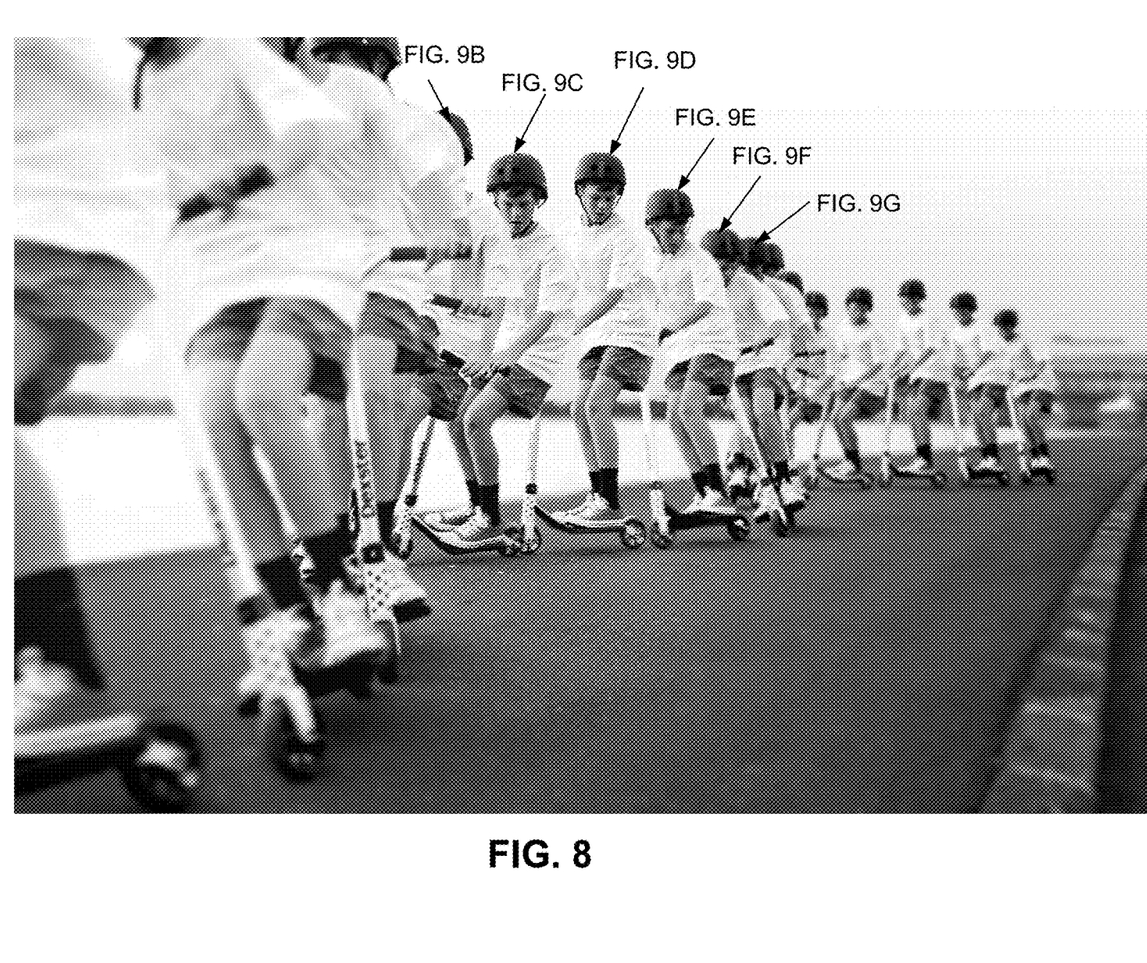
FIG. 8 is a stop action photograph showing how a typical rider may propel the scooter of the present technology.

FIG. 8 is a stop motion photograph showing a rider rolling along substantially flat ground. As can be seen in this series of photographs, the rider has not placed his foot on the ground. Instead he is propelled by shifting his weight side to side in a ski-like fashion. In particular, the rider's knees are bent and "roll" towards the direction in which the rider turns the handlebar. In an equilibrium position, the scooter is substantially vertical with respect to the ground, the wheels contact the ground along the centerline and the handlebar is straight ahead. As the scooter continues to roll, the rider turns the wheel in one direction while at the same time rolling his knees towards the turning direction which effectively moves the rider's center of gravity to that side of the scooter. The rider then continues to shift his weight back towards the center of the scooter while at the same time rolling knees and shifting the center of gravity back towards the center of the scooter and beyond. For these examples, the rider is assumed to be a young boy or girl of about 100-120 pounds and about 5 feet tall. However riders of greater or lesser height and/or weight would achieve similar effects.

FIGS. 9A through 9G schematically illustrate a cycle how the scooter is propelled without necessarily pushing off the ground. Various ones of these figures have been correlated with the position of the rider shown in FIG. 8. FIG. 9A shows the equilibrium position where the wheel is not turned either to the left or the right, and the rider's center of gravity CG is lined up with tangential region of contact between the wheel and the ground along a centerline CL that intersects with the tangent. As indicated above, the wheel has a rounded shape and the wheel is not compressible or deformable such that the tangential contact is made between the wheel and ground. In FIG. 9B, the rider begins to shift his center of gravity CG to the left (rider's perspective) and at the same time (or just afterwards—FIG. 9C) begins to turn the wheels in the direction in which the center of gravity CG is being shifted from the central line. This results in the wheel assuming the position as seen in FIG. 9C, in which a different portion of the wheel contacts the ground in tangential manner. As can be seen from FIG. 9B-1, the tangential contact point CP2 is below the contact point CP1 corresponding to FIG. 9A, and as seen in FIG. 9C-1, the tangential contact point CP3 when the rider was in the equilibrium position of FIG. 9B-1 is now above the contact point CP2 of the wheel and the ground in FIGS. 9B and 9B-1. This distance or delta Δ is representative of potential energy the rider has taken advantage of shifting his weight and/or the wheel one side to the other. In FIG. 9C/9C-1, when the rider has reached the maximum lateral position, he turns the wheel back and begins to shift his center of gravity CG back towards the tangential centerline CL. As shown in FIG. 9D the rider's momentum continues to move his center of gravity to the right of the centerline (FIG. 9E) which after turning results in the center of gravity being positioned as shown FIG. 9F. The rider then shifts his weight back toward the centerline CL (FIG. 9G) and repeats the cycle starting from FIG. 9A. FIG. 4 shows the center of gravity as seen on side view. The center of gravity is spaced about 15-22" (500-600 mm, or about 550 mm) over the supporting surface, forward of the rear wheel, and is spaced about 5-10 inches from the handlebar 17.

Thus, as can be seen, the rider is exposed to a unique riding experience where the rider faces forward with both feet oriented in the riding direction. The rider may tilt the pedal in the direction of turning, in conjunction with steering the handlebar, to initiate a force to propel the scooter in the riding direction. The design allows the rider to easily and intuitively propel himself based using a simple motion which converts the force of gravity acting on the rider into forward motion.

While the present technology has been described in connection with what are presently considered to be the most practical and preferred examples, it is to be understood that the present technology is not to be limited to the disclosed examples, but on the contrary, is intended to cover various modifications and equivalent arrangements included within the spirit and scope of the present technology. Also, the various examples described above may be implemented in conjunction with other examples, e.g., aspects of one example may be combined with aspects of another example to realize yet other examples.

What is claimed is:

1. A scooter comprising:
a main frame having a connecting seat and a connecting bar extending rearward of the connecting seat;
a rotatable front fork supported by the connecting seat and a non-rotatable rear fork extending from a rear end of the connecting bar;
at least one front wheel supported by the front fork and at least one rear wheel supported by the rear fork for linear movement;
a handle bar to control turning of the front fork and therefore the front wheel; and
a foot pedal connected to the connecting bar, the foot pedal having a left foot pedal portion and a right foot pedal portion, each of the left and right foot pedal portions being configured to support a rider's left foot and right foot, respectively, to lie adjacent one another and substantially parallel to the connecting bar;
wherein the front wheel has a diameter, and the front and rear wheels are spaced apart a lateral distance, and wherein a ratio of the diameter to the lateral distance is selected to allow a rider to propel the scooter along flat ground without pushing the feet along the ground, and
wherein the foot pedal has a width that is about five times as wide as a width of the connecting bar to assist in allowing the rider to propel the scooter without pushing the feet along the ground.

2. The scooter of claim 1, wherein the ratio is between about 3 and about 5.

3. The scooter of claim 1, wherein the ratio is about 3.5 to about 4.5.

4. The scooter of claim 1, wherein the ratio is about 3.7 to about 4.3.

5. The scooter of claim 1, wherein the ratio is 4.

6. The scooter of claim 1, wherein the front wheel has a rounded shape as seen from front view to establish substantially tangential line contact with a rolling surface.

7. The scooter of claim 6, wherein the rear wheel has a rounded shape matching the shape of the front wheel.

8. The scooter of claim 6, wherein the front wheel comprises a non-compressible and non-deformable material.

9. The scooter of claim 6, wherein the front wheel comprises a plastic rim and a hard outer cover layer having the rounded shape.

10. The scooter of claim 1, wherein the handle bar includes a cross bar with a pair of opposed handles.

11. The scooter of claim 1, wherein the foot pedal includes a deck connected to the connecting bar, wherein the left foot pedal portion takes the form of a left foot insert supported on the deck and adjacent the connecting bar, and wherein the right foot pedal portion takes the form of a right foot insert supported on the deck and adjacent the connecting bar.

12. The scooter of claim 11, wherein the deck has a substantially trapezoidal shape when seen from top view, the width of the deck being about 20-22 cm at the rear and about 23-25 at the front.

13. The scooter of claim 11, wherein a top surface of the connecting bar and a top surface of each of the foot inserts are substantially co-planar.

14. The scooter of claim 11, wherein each foot insert is made from a resiliently deformable and/or compressible material.

15. The scooter of claim 11, wherein each foot insert has a textured surface to enhance grip.

16. The scooter of claim 11, wherein the deck has a base portion and a rim that projects upwardly from the base.

17. The scooter of claim 16, wherein a thickness of each insert substantially matches a height of the rim.

18. The scooter of claim 11, wherein the deck includes at least one rib for each insert and each insert includes at least one groove to receive the at least one rib.

19. The scooter of claim 11, wherein the deck is connected to the connecting bar with at least one securing device that extends from a bottom surface of the base and through a bottom surface of the connecting bar, with ends of the securing device terminating within the thickness of the connecting bar whilst a top surface of the connecting bar is smooth and does not include any apertures for the securing device.

20. The scooter of claim 19, wherein the base includes a through hole and the connecting bar includes a threaded hole to receive the securing device, and the securing device is a threaded bolt.

21. The scooter of claim 11, wherein the deck and the inserts include a relatively flat rear portion and an inclined front portion which serves as a stop for the rider's feet.

22. The scooter of claim 1, wherein the pedal includes a front extension being shaped to match a shape of the connecting bar and the connecting seat.

23. The scooter of claim 22, wherein a rear of the pedal has a rounded cut out to match a rounded shape of the rear wheel.

24. The scooter of claim 1, further comprising a rotatable shaft associated rotatable within the connecting seat, the shaft being attached the front fork and the handle bar.

25. The scooter of claim 1, wherein the pedal defines a support surface for the rider's feet, the support surface being positioned above a plane connecting a rotation axis of the front wheel and a rotation axis of the rear wheel.

26. The scooter of claim 1, wherein a lower surface of the pedal, as seen in front view, is curved and/or angled upwardly so as to provide increasing clearance with ground as measured from a center of the pedal to left and right sides of pedal.

27. The scooter of claim 1, further comprising a brake connected to the rear end of the connecting bar.

28. The scooter of claim 27, wherein the brake comprises a resilient material that is configured to be pressed against a surface of the rear wheel.

29. A scooter comprising:
a main frame having a connecting seat and a connecting bar extending rearward of the connecting seat;
a rotatable front fork supported by the connecting seat and a non-rotatable rear fork extending from a rear end of the connecting bar;
at least one front wheel supported by the front fork and at least one rear wheel supported by the rear fork;
a handle bar to control turning of the front fork and therefore the front wheel; and
a foot pedal connected to the connecting bar, the foot pedal being about five times wider that the connecting bar, the foot pedal having a left foot pedal portion and a right foot pedal portion; each of the left and right foot pedal portions being configured to support a rider's left foot and right foot, respectively, to lie side-by-side with one another and substantially parallel to the connecting bar;
wherein the front wheel has a rounded shape as seen from front view to establish substantially tangential line contact with a rolling surface as the handle bar is tilted up to about 15° from vertical.

30. The scooter of claim 29, wherein the rear wheel has a rounded shape matching the shape of the front wheel.

31. The scooter of claim 29, wherein the front wheel comprises a non-compressible and non-deformable material.

32. The scooter of claim 29, wherein the front wheel comprises a plastic rim and a hard outer cover layer having the rounded shape.

33. The scooter of claim 29, wherein the front wheel has a diameter, and the front and rear wheels are spaced apart a lateral distance, and wherein a ratio of the diameter to the lateral distance is selected to allow a rider to propel the scooter without pushing the feet along ground.

34. The scooter of claim 33, wherein the pedal defines a support surface for the rider's feet, the support surface being positioned above a plane connecting a rotation axis of the front wheel and a rotation axis of the rear wheel.

35. The scooter of claim 29, wherein a lower surface of the pedal, as seen in front view, is curved and/or angled upwardly so as to provide increasing clearance with ground as measured from a center of the pedal to left and right sides of pedal.

\* \* \* \* \*